(12) United States Patent
Gerdes

(10) Patent No.: US 9,014,293 B2
(45) Date of Patent: Apr. 21, 2015

(54) TRANSPOSITIONAL MODULATION SYSTEMS AND METHODS

(71) Applicant: Medusa Scientific, LLC, Tucson, AZ (US)

(72) Inventor: Richard C. Gerdes, Tucson, AZ (US)

(73) Assignee: TM IP Holdings, LLC, Tucson, AZ (US)

( * ) Notice: Subject to any disclaimer, the term of this patent is extended or adjusted under 35 U.S.C. 154(b) by 54 days.

(21) Appl. No.: 13/841,889

(22) Filed: Mar. 15, 2013

(65) Prior Publication Data

US 2014/0269969 A1 Sep. 18, 2014

(51) Int. Cl.
*H03C 5/00* (2006.01)
*H03D 5/00* (2006.01)
*H04L 27/02* (2006.01)

(52) U.S. Cl.
CPC ..................................... *H04L 27/02* (2013.01)

(58) Field of Classification Search
CPC .............................. H04L 27/18; H04B 1/715
USPC .................. 375/269, 273, 277, 276, 281, 286
See application file for complete search history.

(56) References Cited

U.S. PATENT DOCUMENTS

| 3,968,486 | A | | 7/1976 | Gerdes ........................... 340/347 |
|---|---|---|---|---|
| 4,259,888 | A | * | 4/1981 | Gross ............................. 84/627 |
| 4,301,415 | A | * | 11/1981 | McFayden ..................... 327/129 |
| 4,342,245 | A | * | 8/1982 | Gross .............................. 84/604 |
| 4,613,974 | A | | 9/1986 | Vokac et al. ..................... 375/37 |
| 4,680,633 | A | | 7/1987 | Gerdes et al. .................. 358/171 |
| 4,989,219 | A | | 1/1991 | Gerdes et al. .................... 375/17 |
| 5,021,786 | A | | 6/1991 | Gerdes .......................... 341/143 |
| 5,124,706 | A | | 6/1992 | Gerdes .......................... 341/156 |
| 5,155,672 | A | * | 10/1992 | Brown ........................... 363/43 |
| 5,165,017 | A | | 11/1992 | Eddington et al. ............ 381/68.4 |
| 5,184,218 | A | | 2/1993 | Gerdes .......................... 358/133 |
| 5,200,715 | A | | 4/1993 | Gerdes et al. .................. 332/185 |
| 5,327,237 | A | | 7/1994 | Gerdes et al. .................. 348/476 |
| 5,557,333 | A | | 9/1996 | Jungo et al. ................... 348/473 |
| 6,559,757 | B1 | | 5/2003 | Deller et al. ............. 340/310.01 |
| 2003/0071684 | A1 | * | 4/2003 | Noori ............................ 330/149 |
| 2004/0252531 | A1 | * | 12/2004 | Cheng et al. .................... 363/43 |
| 2005/0065901 | A1 | * | 3/2005 | Diong ............................ 706/25 |
| 2011/0043039 | A1 | | 2/2011 | Mancebo del Castillo Pagola ........................... 307/52 |

OTHER PUBLICATIONS

International Search Report and Written Opinion issued in related application No. PCT/US13/32565, dated Aug. 2, 2013 (12 pgs).

* cited by examiner

*Primary Examiner* — Qutbuddin Ghulamali
(74) *Attorney, Agent, or Firm* — Hayes Soloway P.C.

(57) ABSTRACT

Systems and methods for transpositional modulation and demodulation are provided. One such method for generating a signal includes the steps of providing a look-up table having a plurality of quarter-cycle waveforms, each of said quarter-cycle waveforms associated with a respective input level; receiving an input signal; and outputting quarter-cycle waveforms associated with levels of the received input signal. Systems for transpositional modulation are also provided. One such system for generating a signal includes a look-up table having a plurality of quarter-cycle waveforms. Each of the quarter-cycle waveforms are associated with a respective input level, and the look-up table is configured to receive an input signal, and output quarter-cycle waveforms associated with levels of the received input signal.

9 Claims, 7 Drawing Sheets

The Sub-Cycle Calibration method of TM demodulation.

The Sub-Cycle Calibration method of TM demodulation.

TRANSPOSITIONAL MODULATION SYSTEMS AND METHODS

FIELD OF THE DISCLOSURE

The present disclosure is generally related to signal processing, and more particularly is related to systems and methods for generating transpositional modulation signals, and for demodulating transpositional modulation signals.

BACKGROUND OF THE DISCLOSURE

Existing transmission systems, whether carrying voice, video or data, have bandwidth limits imposed by domestic and world regulatory agencies controlling the utilization of the frequency spectra. Carrier modulation methods have evolved from the original Amplitude Modulation to present methods combining two or more carriers with Amplitude, Frequency or Phase modulations in various combinations. Advanced carrier modulation methods were developed to maximize energy throughout the assigned channel bandwidth thus providing the greatest available information bandwidth for the assigned communication channel.

A new fundamental carrier modulation was developed and first patented (see, e.g., U.S. Pat. No. 4,613,974 to Vokac et al., incorporated in its entirety herein) that applies a new type of carrier modulation that does not interfere with amplitude, frequency and/or phase modulation coexisting on the same carrier signal.

The concept of Transpositional (TM) Modulation was based on an earlier concept of how to add information to a carrier signal without affecting its amplitude, frequency or phase (see, e.g., U.S. Pat. No. 4,613,974 to Vokac et al., incorporated in its entirety herein). By producing an inflection as shown below, information can be conveyed by the carrier signal. This method is not detected by existing demodulators of amplitude, frequency or phase modulation.

Using the previously patented method of generation the following time-domain waveform is generated with the inflections exaggerated for clarity. In real-world applications, the inflections are not visible.

A deficiency of earlier methods of generating this type of waveform is a small amplitude variation that required removal by an adjusting circuit. For example, FIG. 1 is an illustration of a TM Modulated signal 100 generated in accordance with the prior art techniques taught by U.S. Pat. No. 4,613,974. As can be seen, an amplitude variation error exists between negative peaks 101 and 102.

Thus, a heretofore unaddressed need exists in the industry to address the aforementioned deficiencies and inadequacies.

SUMMARY OF THE DISCLOSURE

Embodiments of the present disclosure provide methods and systems for generating modulated signals, and for demodulating signals. In one embodiment, a method of generating a signal is provided that includes the steps of: providing a look-up table having a plurality of quarter-cycle waveforms, each of the quarter-cycle waveforms associated with a respective input level; receiving an input signal; and outputting quarter-cycle waveforms associated with levels of the received input signal.

In another embodiment, a method of generating a signal is provided that includes the steps of: receiving a carrier signal; receiving an input signal; generating quarter-cycle waveforms based on the input signal; and assembling the generated quarter-cycle waveforms into a continuous output signal, wherein the output signal includes a first inflection between adjacent quarter-cycles forming a segment of the output signal between a first negative peak and a positive peak, and wherein the output signal includes a second inflection between adjacent quarter-cycles forming a segment of the output signal between the positive peak and a second negative peak, wherein the first and second inflections represent a level of said input signal.

In another embodiment, a method for generating a modulated signal is provided that includes the steps of: receiving a carrier signal; receiving an input signal; generating a third harmonic sideband based on the received signals; and frequency-shifting the third harmonic sideband to the frequency of the received carrier signal.

In yet another embodiment, a method of demodulating a signal is provided that includes the steps of: adding a third harmonic to the modulated signal; detecting a peak amplitude of the modulated signal plus third harmonic; generating a reference ramp when a peak amplitude is if detected; detecting an inflection in the modulated signal plus third harmonic; sampling the reference ramp when an inflection is detected; and holding and outputting the sampled value.

In another embodiment, a method of demodulating a signal is provided that includes the steps of: filtering out all but the third harmonic component from the modulated signal; and detecting the phase of the third harmonic component.

In still another embodiment, a method of demodulating a signal is provided that includes the steps of: converting the modulated signal to a digital signal; and performing a fast Fourier transform on the digital signal.

In yet another embodiment, a system for generating a signal is provided. The system includes a look-up table having a plurality of quarter-cycle waveforms. Each of the quarter-cycle waveforms are associated with a respective input level. The look-up table is configured to receive an input signal, and output quarter-cycle waveforms associated with levels of the received input signal.

In another embodiment, a system for generating a signal is provided that includes a waveform generator configured to generate quarter-cycle waveforms based on a received carrier signal and a received input signal. An analog gate is included for assembling the generated quarter-cycle waveforms into a continuous output signal, wherein the output signal includes a first inflection between adjacent quarter-cycles forming a segment of the output signal between a first negative peak and a positive peak, and wherein the output signal includes a second inflection between adjacent quarter-cycles forming a segment of the output signal between the positive peak and a second negative peak, wherein the first and second inflections represent a level of said input signal.

In another embodiment a system for generating a modulated signal is provided that includes a processor configured to generate a third harmonic sideband based on a received carrier signal and a received input signal, and to frequency-shift the third harmonic sideband to the frequency of the received carrier signal.

In yet another embodiment, a system for demodulating a signal is provided that includes a signal adder for adding a third harmonic to the modulated signal; a peak detector for detecting a peak amplitude of the modulated signal plus third harmonic; a reference ramp generator for generating a reference ramp when a peak amplitude is detected; an inflection detector for detecting an inflection in the modulated signal plus third harmonic; and a sample and hold element for sampling the reference ramp when an inflection is detected, and holding and outputting the sampled value.

In another embodiment, a system for demodulating a signal is provided that includes a subtraction element for subtracting a fundamental carrier signal from a received modulated signal; a fundamental notch filter for filtering out the fundamental carrier signal, thereby leaving only the third harmonic component from the modulated signal; and a third harmonic phase detector for detecting the phase of the third harmonic component.

In another embodiment, a system for demodulating a signal is provided that includes an analog to digital converter for converting the modulated signal to a digital signal; and a processor configured to perform a fast Fourier transform on the digital signal.

Embodiments provided by the present disclosure provide a number of advantageous features, including:

(1) Modulation generation is from quarter cycle periods compatible with a look-up table as one method—

(2) Modulation generation is compatible with direct sideband generation as one method—

(3) De-modulation process utilizes time domain recreation for subcycle calibration as one method—

(4) De-modulation process utilizes phase detection of generated third harmonic component as one method—

(5) De-modulation process utilizes frequency domain fast Fourier transform analysis as one method.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Many embodiments of the disclosure may take the form of computer-executable instructions, including algorithms executed by a programmable computer or microprocessor. However, the disclosure can be practiced with other computer system configurations as well. Certain aspects of the disclosure can be embodied in a special-purpose computer or data processor that is specifically programmed, configured or constructed to perform one or more of the methods or algorithms described below.

Aspects of the disclosure described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks including the cloud. Data structures and transmissions of data particular to aspects of the disclosure are also encompassed within the scope of the disclosure.

Figure 1:
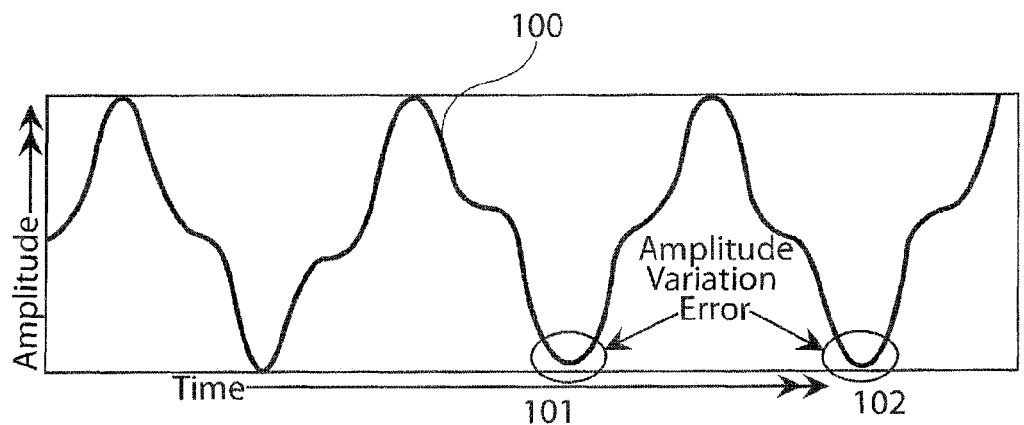
FIG. 1 is an illustration of a TM Modulated signal generated in accordance with the prior art techniques.
Figure 2:
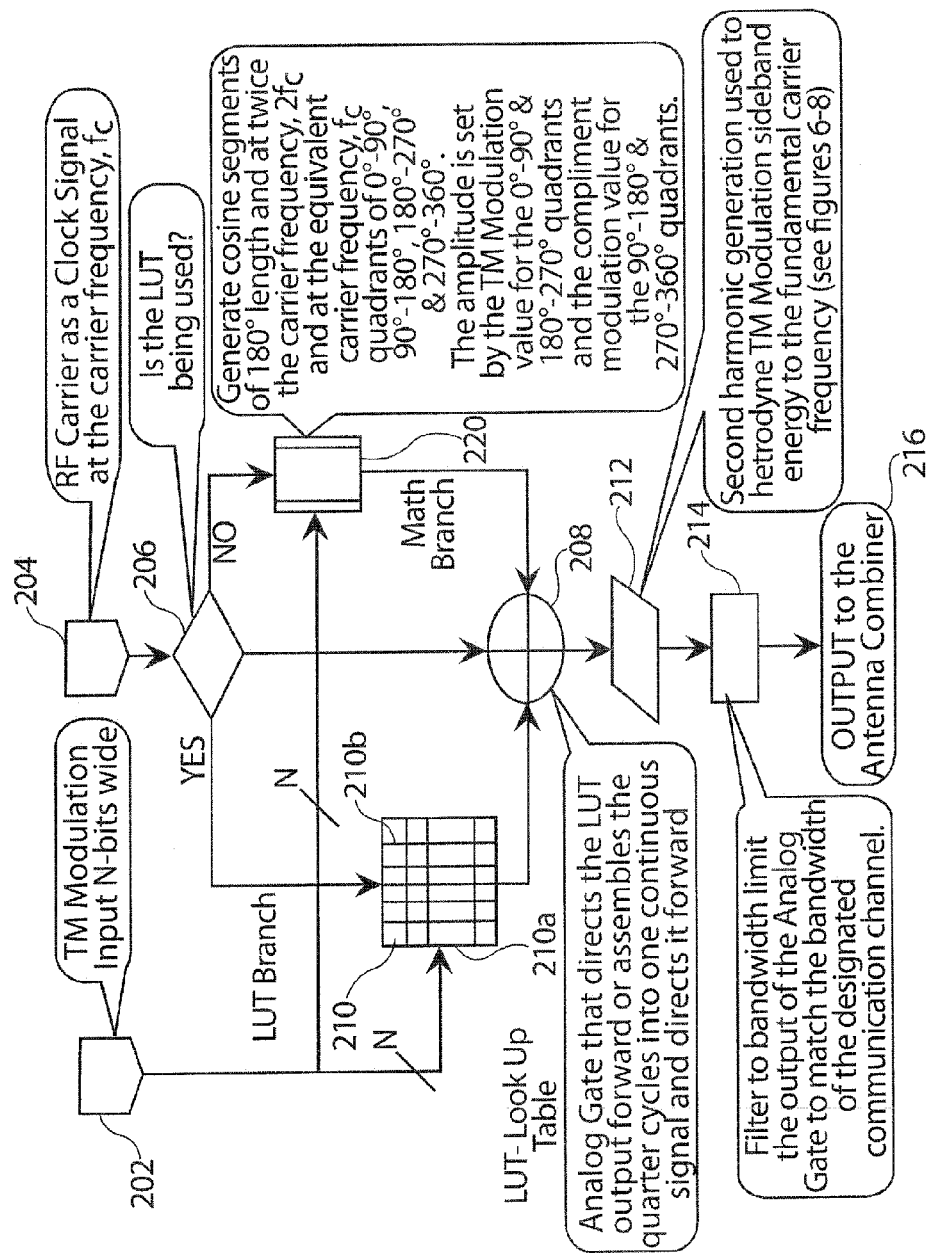
FIG. 2 is a flowchart illustrating a method of modulating a carrier signal, in accordance with a first exemplary embodiment of the present disclosure.

FIG. 2 is a flowchart 200 illustrating a method of modulating a carrier signal, in accordance with a first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently in reverse order, depending on the functionality involved, as would be understood by those reasonably skilled in the art of the present invention. The method solves the amplitude variation problem of the prior art (e.g., as shown in FIG. 1 above) and may be implemented in either hardware or software, or any combination thereof. The method shown in FIG. 2, which may be referred to as the "quarter-cycle assembly" (QC) method, may include a Look-Up-Table (LUT) 210 as a fast method of obtaining the results, that otherwise may be produced utilizing mathematical functions, without the need of continuously performing the math. The QC method is based in the time-domain.

Figure 3:
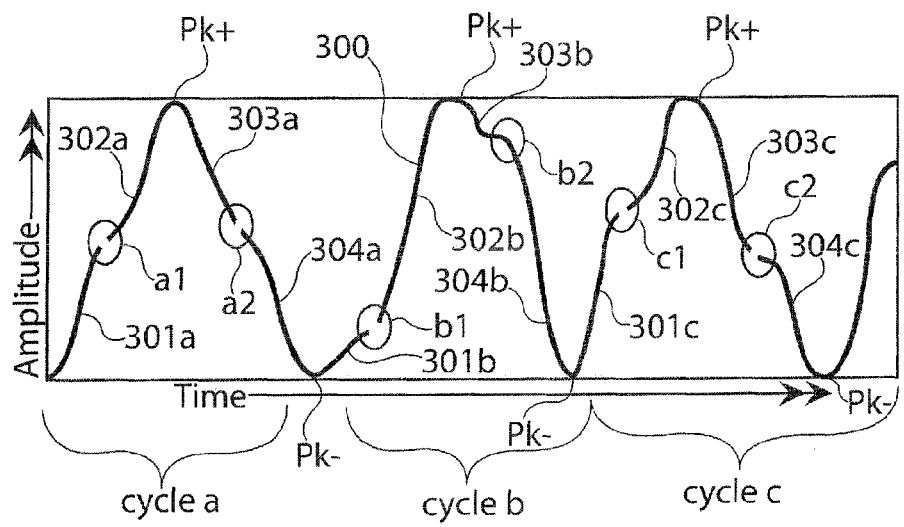
FIG. 3 is an illustration of a signal generated as quarter-cycles, in accordance with an embodiment of the present disclosure.

Referring to FIG. 3, the modulated output signal 300 from the method shown in FIG. 2 includes four distinct quarter cycle segments for each full signal cycle. FIG. 3 shows three full cycles (e.g., cycles a, b and c), as may be output by the quarter-cycle method shown in FIG. 2. Each cycle is composed of four quarter cycle segments (e.g., 301, 302, 303 and 304). A gap is shown between quarter cycle segments for illustrative purposes only. Further, the amplitude positions of the inflections (a1, a2, b1, b2, c1, c2) are exaggerated for illustration purposes. The inflections are formed between adjacent quarter cycle segments, as shown.

As shown in FIG. 3, the "first" quarter of each cycle (301a, 301b and 301c) may have different amplitudes depending on the value of the applied modulation. The same applies for each other quarter of each cycle shown. That is, the second (302a, 302b, 302c), third (303a, 303b, 303c) and fourth (304a, 304b, 304c) quarters of each cycle may have different amplitudes depending on the value of the applied modulation. When the "first" quarter (e.g., 301a, 301b, 301c) in a cycle has a low amplitude, the "second" quarter (e.g., 302a, 302b, 302c) of that same cycle has a complimenting higher amplitude so that a constant amplitude always exists between the negative peak value ($Pk_-$) of the whole cycle and the positive peak value ($Pk_+$) of that cycle. The same is true of the "third" and "fourth" quarters of each cycle. The causes the positive peak values ($Pk_+$) of each cycle to always be the same. The negative peak values ($Pk_-$) are also made equal to eliminate amplitude variations due to the applied modulation values.

As is further shown in FIG. 3, the "first" (301a, 301b, 301c) and "third" (303a, 303b, 303c) quarters for a respective cycle have the same amplitudes. Similarly, the "second" (302a, 302b, 302c) and "forth" (304a, 304b, 304c) quarters for a respective cycle also have the same amplitudes. The purpose for this is to force the area under the curve of each cycle to be the same, regardless of applied modulation value. This ensures that the average value of each cycle is zero this avoiding any "DC" value shift in the carrier signal due to the applied modulation values.

However, it is noted that for some applications, DC shift may be acceptable, and thus there may be an inconsistent area under the curve, i.e. there need not be symmetry among cycles. In such a case, information or "symbols" may be conveyed at a rate of two symbols per cycle, or two different inflection points may be present on each cycle (e.g., one on located along the rising half cycle between the negative peak and positive peak, and the other located along the falling half cycle between the positive peak and negative peak).

Each quarter cycle may be generated by a constant clock or time step hence there is no frequency change from one cycle to the next as a result of the applied modulation value. Each inflection (a1, a2, b1, b2, c1, c2) occurs at precisely the angular equivalent of 180 degree separation from one half cycle to the next half cycle. This ensures that there is no phase change due to the applied modulation value.

Figure 4:
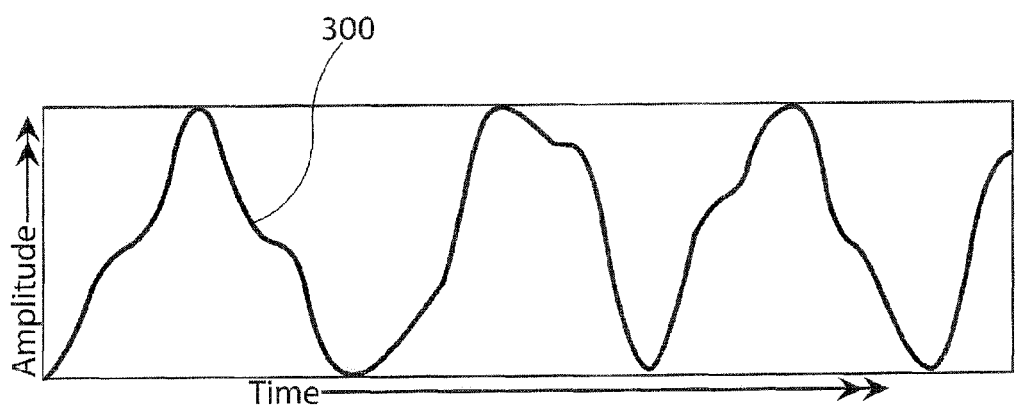
FIG. 4 is an illustration of the signal shown in FIG. 3 after summing the quarter-cycles, in accordance with an embodiment of the present disclosure.

By summing the quarter cycles (e.g., those shown in FIG. 3), a smooth and continuous waveform 300 is obtained, as shown in FIG. 4.

Figure 5:
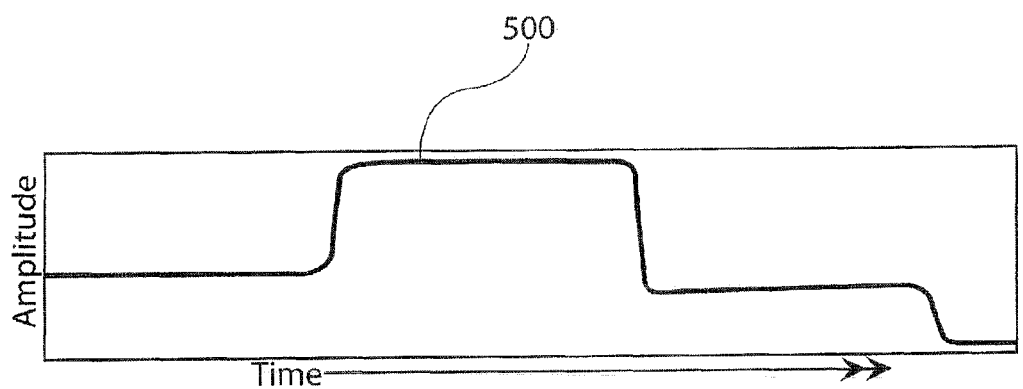
FIG. 5 is an illustration of an input modulation signal which may be used, by embodiments provided by the present disclosure, to generate the signal shown in FIG. 4.

FIG. 5 illustrates a TM modulation signal 500, which is used to produce the modulated signal 300 shown in FIG. 4. As shown in FIGS. 4 and 5, there is one TM Modulation value 500 per carrier cycle. However, as noted above, there may be two TM Modulation values per carrier cycle in the case where the cycles may have a different area under curve, i.e. there need not be symmetry among cycles such that you may convey two symbols on each cycle. In such a case, there could be two TM modulation values per carrier cycle, thereby representing two different symbols (or information) per carrier cycle. This technique may be suitable for transmission over optical fiber, for example, because there will be no other signals occupying the transmission bandwidth; however, DC shift is typically not suitable for transmission over other mediums.

A variable designated as the TM Modulation period, $t_{TMM}$, is the time a TM Modulation value is held, and is an integer multiple of the carrier period. This would imply that, in such a case, the maximum TM Modulation frequency, $f_{TMM}$, is one-half of the carrier frequency, $f_C$. That is, the modulation bandwidth is limited to ½ of $f_C$, as it is known that the Nyquist rate, or lower bound for the sample rate for alias-free signal sampling, is two times the bandwidth of a bandlimited signal. However, where two TM modulation values are present per carrier cycle, then the maximum TM modulation frequency, $f_{TMM}$, equals the carrier frequency, $f_C$. There is no minimum value of $f_{TMM}$, including DC response.

Referring again to FIG. 2, the LUT 210 stores a quarter cycle unique to each value of TM modulation. For each carrier cycle there are four quarter cycles (e.g., as shown in FIG. 3). If there is an assignment of 1 digital bit (N=1) for each TM Modulation period, then there would need to be just two unique TM modulation levels, or two unique sets of two quarter cycles, stored in the LUT 210—one level signifying a logic "0" and a second level signifying a logic "1". If there are two digital bits (N=2) for each $t_{TMM}$ then there would be four levels of potential TM Modulation. Similarly, if there are three bits (N=3) for each $t_{TMM}$, then there would be eight levels of TM Modulation, and so on.

The LUT 210 contains $2^N$ different quarter cycle waveshapes, or $4*2^N$ total waveshapes, as each full waveshape is composed of 4 quarter cycle waveshapes. The number of time-steps or clock periods (e.g., the processor or CPU clock for reading the LUT 210) per quarter cycle would depend on the tolerable waveshape perturbations that the electronics for implementing the method can tolerate. At carrier frequencies in the 300 MHz area, this may require sub-nanosecond time steps. Lower carrier frequencies may be more amenable to both TM methods (e.g., the LUT branch and the "math branch," as described herein) and could be heterodyned up to the carrier frequency.

At block 202, a TM Modulation signal is input to the LUT 210. The TM modulation signal may be a signal containing, or represented by, any number of digital bits (e.g., an N-bits wide signal). The LUT 210 contains values or representations for the quarter cycles that may otherwise be generated by the math branch 220. For example, for each TM modulation value, which may be represented by rows 210a (e.g., 1 to $2^N$), a quarter cycle may be associated with the TM modulation value and stored, represented in columns 210b, as coordinate data (e.g., x,y) over a period of increasing time (e.g., from an initial time to ¼ of a cycle). At block 204, a carrier signal is input having a carrier frequency of $f_C$. The carrier signal may be an RF signal and may serve as a clock signal. At block 206, a decision is made as to whether the modulation will be performed using the LUT 210, or using the math branch 220. Either the LUT 210 or the math branch 220 may be utilized to generate the modulated output signal. If the LUT 210 is utilized, the quarter cycles associated with the received TM modulated values will be output from the LUT 210 to the analog gate 208.

If the math branch 220 is utilized, e.g., the math branch 210 is selected from block 206, then the TM modulation signal is input to the math block 220. The math block 220 outputs substantially the same quarter cycle waveforms as would have been output by the LUT block 210 for the same received TM modulation values. However, rather than storing the associated quarter cycle values for each TM modulation value, the math block 220 generates the quarter cycles for each received TM modulation value. The math block 220 generates the modulated quarter cycles by first generating cosine segments of 180° length, at twice the carrier frequency ($2f_C$), and at the equivalent carrier frequency quadrants of 0°-90°, 90°-180°, 180°-280°, and 270°-360°. These generated cosine segments thus make up quarter cycle segments at the carrier frequency. The amplitude is set by the received TM modulation value for the 0°-90° and 180°-270° quadrants (i.e., the "first" and "third" quarter cycles), and the compliment modulation value for the 90°-180° and 270°-360° quadrants. It will be readily understood by those having ordinary skill in the relevant art that any sinusoidal signal can be generated using known mathematical relationships, which may be implemented in circuits and/or software. Thus, the cosine segments of the math branch 220, having an amplitude set by the received TM modulation value, may be generated accordingly.

The math branch 220 performs math calculations to generate the quarter cycle segments using a processor having a clock that is a higher multiple of the carrier frequency—either to execute software code or to drive a hardware-based waveform generator, which may be any known waveform generator. It is likely that the math branch 220 would need a higher clock frequency than the LUT branch 210. The output from either the LUT 210 or the math branch 220 is directed to an analog gate 208 that assembles the quarter cycles into one continuous signal and directs it forward to the heterodyne block 212.

Figure 6:
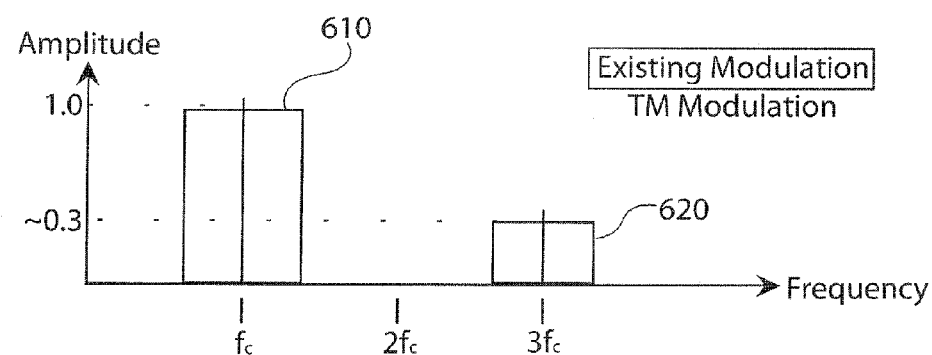
FIG. 6 is a plot illustrating the frequency spectrum of the signal shown in FIG. 4.

For transmission and heterodyne purposes, the frequency domain provides insight to aspects of this disclosure. FIG. 6 is a plot of the frequency spectrum of the TM modulated signal 300 shown in FIG. 4, where $f_C$ is the carrier signal frequency, and $2f_C$, $3f_C$, etc. are the second, third, etc. harmonics of the carrier frequency. The signal 300 has the spectrum as shown in FIG. 6 at the point of origin with visible inflections in some cases.

Figure 7:
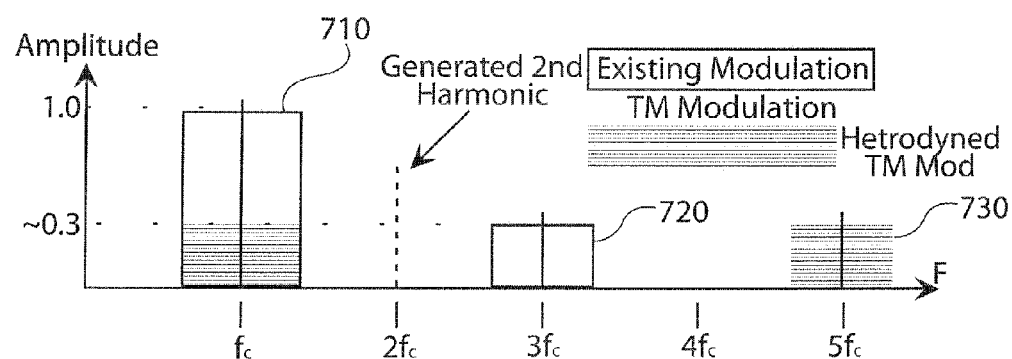
FIG. 7 is a plot illustrating the frequency spectrum resulting from heterodyning the third harmonic component with the second harmonic of the signal shown in FIG. 6, in accordance with an embodiment of the present disclosure.

In addition to the fundamental carrier frequency component 610, there is a third harmonic component 620 of the signal 300 that contains a phase modulation. TM modulation components are only at the third harmonic, i.e. the TM modulation components are the third harmonic components 620. There is no second harmonic signal. By generating a second harmonic signal, at block 214, as a local oscillator and using a mixer circuit to heterodyne the third harmonic component, there will be two output frequencies: $(3f_C-2f_C)$ and $(3f_C+2f_C)$. This is illustrated in FIG. 7. The TM modulation component, i.e., the third harmonic component 620, will be shifted down to the fundamental carrier frequency (signal 710). The additive component of the heterodyning, i.e., the fifth harmonic component 730, may be filtered out (e.g., by filter 810 shown in FIG. 8) at block 214, and may be filtered to match the output of the designated communications channel for transmission.

In contrast to known modulation techniques, as provided by the present disclosure the 3rd harmonic is phase shifted, but the phase shift is relative to the fundamental carrier, not the 3rd harmonic. In normal FM and PM transmissions, what is phase shifted is the carrier itself. TM does not alter the fundamental and the 3rd harmonic phase is only related to the fundamental.

The distinction is important for several reasons. For each half-cycle of the fundamental carrier (i.e., each TM modulated Symbol) there are 1.5 cycles of the 3rd harmonic with no modulation. There is only a change of the 3rd harmonic when the data changes (i.e., when the TM modulation signal 500 changes). Thus, there is very little impact on power and spectrum, and another reason why we have transparency with conventional modulation since in most practical applications, there may be 100 or more carrier cycles per TM symbol—limited to the communication channel—like AM and FM broadcast radio, during which there is no change (i.e., no change of modulation) of the 3rd harmonic. It is simply shifted in phase (in time) with respect to the fundamental.

Implementation of the QC method requires analog bandwidth that is three or more times wider than the carrier frequency, as the third harmonic (e.g., $3f_C$) is utilized. Further, the QC method requires a clock frequency that is 16 times the carrier signal frequency for just four time steps per quarter cycle. QC may be generated at a lower carrier signal and heterodyned upward to the desired carrier frequency. The lower carrier frequency will dictate the upper frequency limit of the TM Modulation value.

Figures 9A, 9B:
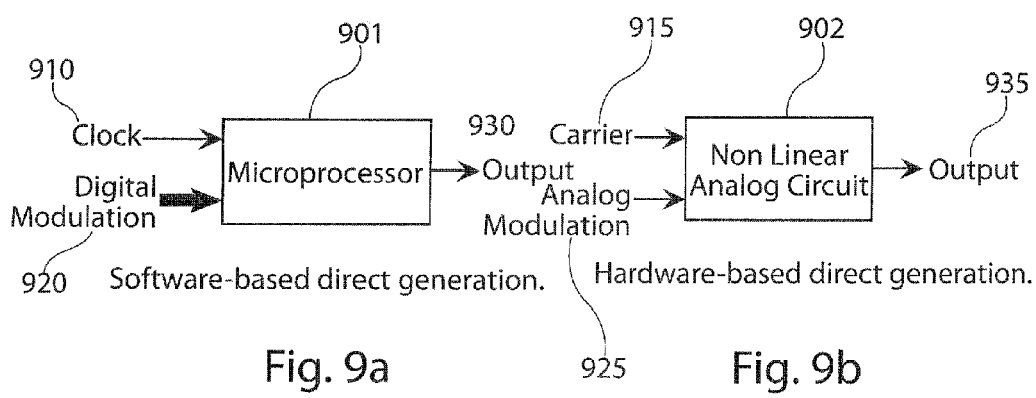
FIG. 9a is a block diagram illustrating a software-based direct spectrum system for generating a signal, in accordance with an embodiment provided by the present disclosure.
FIG. 9b is a block diagram illustrating a hardware-based direct spectrum system for generating a signal, in accordance with an embodiment provided by the present disclosure.

FIGS. 9a and 9b are block diagrams illustrating a Direct Spectrum (DS) generation system and method, in a further embodiment of the present disclosure. The DS generation method may be a simpler implementation of the TM modulation. The DS method generates the sideband spectrum directly and adds the energy to whatever else exists within the bandwidth of the communication channel. The DS method is based in the frequency domain.

Referring to FIG. 6, an existing transmitter has some form of complex modulation. Typical types of complex modulation in use include QAM, QPSK, OFDM, and so on. The sideband energy of the existing modulation is represented by the component 610 in FIG. 6. Adding TM Modulation produces the third harmonic and the TM sideband energy is represented by the component 620. Note that a second harmonic component may be present but contains no modulation.

The second harmonic signal is valuable in that it can be used to shift the TM sideband energy 620 downward to the fundamental carrier frequency 610. This is done by heterodyning using a mixer function that multiplies two sinusoidal input signals together and produces a subtractive and an additive frequency output. Referring to FIG. 7, the hatching represents the energy that has been converted from the third harmonic 720 to the fundamental 710 and 5th harmonic 730.

The use of the second harmonic is optional. A phase-locked-loop, as known in the art, can provide a stable second harmonic. Also, a non-linearity that might exist may actually down-convert some of the sideband energy but may not be stable or a reliable method of down-conversion.

Figure 8:
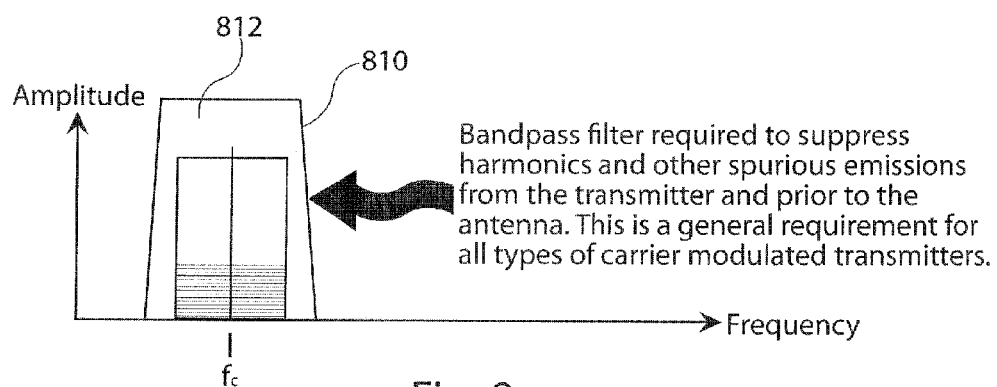
FIG. 8 is an illustration of a filter which may be applied to embodiments provided by the present disclosure.

Communication regulations require that all transmitters must use an output filter to guarantee that no energy be radiated that is outside of the designated communication channel. As shown in FIG. 8, an output filter 810 may be utilized to eliminate the harmonics for transmission in the designated communication channel. The filter may include a passband 812.

Utilizing the concepts described above, FIGS. 9a and 9b illustrate two systems and methods for direct spectrum generation. FIG. 9a illustrates a software-based system and method for direct spectrum generation, while FIG. 9b illustrates a hardware-based system and method for direct spectrum generation. In FIG. 9a a clock signal 910 and a digital modulation signal 920 are input to a microprocessor 901. In FIG. 9b a carrier signal 915 and an analog modulation signal 925 are input into a non-linear analog circuit 902. The third harmonic sidebands (e.g., the TM modulation component 620) are directly generated by microprocessor 901 and/or circuit 902, based on the input signals. The microprocessor 901 and/or circuit 902 further may directly heterodyne the third harmonic sideband 620 with the input clock 910 (FIG. 9a) or carrier 915 (FIG. 9b) to directly create the sideband energy (e.g., 710) at the fundamental frequency. The DS method relies on either software generation of the overall math expression or non-linear analog circuits that execute the math expressions. That is, the microprocessor 901 (FIG. 9a) and/or the circuit 902 (FIG. 9b) directly computes and generates the third harmonic sideband 620 based on the input signals, utilizing known mathematical relationships. The third harmonic sideband 620 is then heterodyned by the microprocessor 901 and/or non-linear analog circuit 902 to shift the third harmonic sideband 620 to the fundamental frequency.

Figure 10:
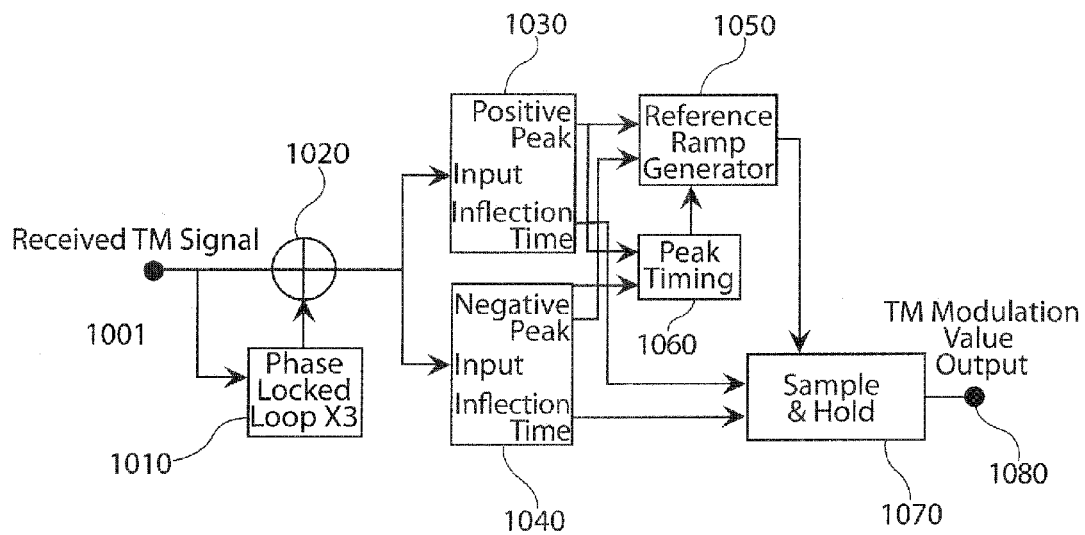
FIG. 10 is a block diagram illustrating a sub-cycle calibration system for demodulating a signal, in accordance with an embodiment provided by the present disclosure.

Systems and methods for receiving and demodulating Transpositional Modulation will now be disclosed. FIG. 10 is a block diagram illustrating a system a method for demodulating TM modulation signals, which may be referred to as "Sub-Cycle Calibration" (SCC). The SCC demodulation method of TM Modulation operates in the time domain by reconstruction of the waveform, for example as shown in the QC method section (e.g., signal 300 of FIG. 4).

The SCC method adds a third harmonic to the received signal 1001 in a wide bandwidth environment. A phase locked loop 1010 generates a precise and unmodulated third harmonic signal, which is added or multiplied to the received signal 1001 in element 1020. The voltage levels of each positive and negative peak is then detected by positive peak detector 1030 and/or negative peak detector 1040 and used to generate a reference ramp (by reference ramp generator 1050) with matching negative and positive peak values. Thus, at every ½ cycle of the received signal 1001 the system (i.e., the occurrence of each peak) is calibrated, as a new reference ramp is generated. The ramp is recreated with each half-cycle of the carrier signal 1001. The timing of the peaks is used by the peak timing element 1060 to set the timing of the reference ramp. Inflections are detected by the detectors 1030 and 1040 and the timing of the inflection is used to sample the reference ramp, output by the reference ramp generator 1050, and hold the sampled ramp value. That voltage is the TM modulation analog value and is output by the sample and hold element 1070, and may either be used directly or may be converted to digital. The reference ramp has a positive slope for the negative to positive carrier half cycle. For the next half carrier cycle (i.e., the positive to negative half cycle), the reference ramp has a negative slope.

An advantage of the SCC demodulation system and method is that it provides a robust demodulation technique. This is because SCC demodulation is concerned only with the occurrence of negative and positive peaks, and the presence of an inflection between these peaks. As such, SCC demodulation is much less susceptible to errors caused by noise than other demodulation techniques may be.

Figure 11:
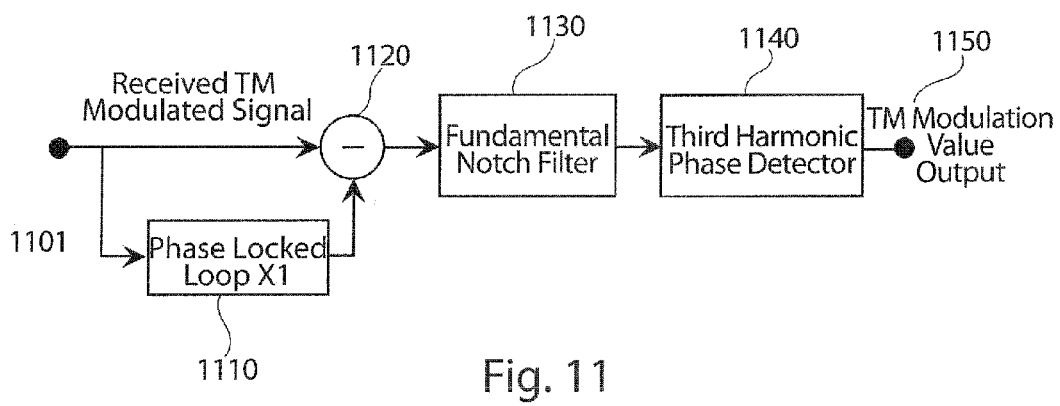
FIG. 11 is a block diagram illustrating a third harmonic phase detection system for demodulating a signal, in accordance with an embodiment provided by the present disclosure.

FIG. 11 is a block diagram illustrating a demodulation system and method, which may be called "Third-Harmonic Phase Detection" (3PD), in accordance with a further embodiment of the present disclosure. The Third-Harmonic Phase Detection (3PD) demodulation method of TM Modulation operates by regenerating a third harmonic component and demodulating a phase modulation existing on that component.

As shown in FIG. 11, the received TM modulated signal 1101 is used by a phase-locked loop 1110 to generate a stable, unmodulated fundamental carrier signal which is subtracted by subtraction element 1120 from the received signal 1101. The output from subtraction element 1120 may be filtered by a fundamental notch filter 1130 to filter out any spurious emissions at the fundamental carrier frequency. The remaining signal is thus the sideband energy (e.g., the TM modulation component) which drives a third harmonic phase detector 1140. The third harmonic phase detector 1140 may be any known or conventional phase detector. The resulting output 1150 is the TM modulation analog value.

Figure 12:
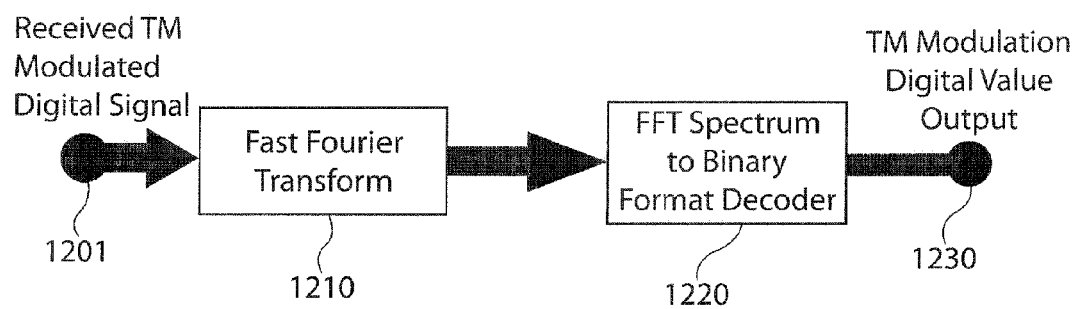
FIG. 12 is a block diagram illustrating a Fast Fourier Transform based system for demodulating a signal, in accordance with an embodiment provided by the present disclosure.

FIG. 12 is a block diagram illustrating a further demodulation system and method, in accordance with another embodiment of the present disclosure. The demodulation system and method shown in FIG. 12 is a Fast Fourier Transform (TMFFT) demodulation method of TM Modulation and operates by the analysis of the sideband spectrum.

The TMFFT method may provide the most simple hardware implementation; however it may also be the most complex in terms of signal processing. The TM modulated received signal 1201 is analyzed by an FFT function 1210 once it has been quantized by an analog-to-digital converter. Once the receiver has amplified the signal to a level suitable for conversion to digital bits, the signal is output to an element 1210, which may be a processor such as a computer CPU or a more dedicated processor such as a Field Programmable Gate Array or any custom integrated circuit specifically designed to calculate the Fourier Transform. The output of the FFT element 1210 is a number of data values representing the signal strength of the received TM signal 1201 at discrete frequencies. The TM spectrum is known since it relates to the TM mode of operation—the number of bits per symbol (i.e. number of assigned bits per TM modulation period) and the symbol rate.

The symbol rate equals the carrier frequency divided by the number of carrier cycles per symbol. Stated mathematically, in an illustrative example:

1 MHz carrier frequency/10 carrier cycles per symbol=100,000 symbols per second.

The frequency of the symbol is: 100,000 symbols per second/2=50,000 symbol cycles per second.

The frequency of interest in the example thus is 50 kHz, i.e., the symbol cycle frequency, which is 50 kHz above and below the carrier frequency. A more accurate FFT demodulation process will also look at 100 kHz and 150 kHz to include additional Bessel-related sidebands when there are many modulation levels such as 6 bits per symbol or 64 modulation levels. Also, when there are just a few carrier cycles per symbol, more sideband frequencies reduces the demodulation error rate. In some receivers the carrier frequency is heterodyned to an intermediate frequency (IF) for amplification or to baseband which places the carrier frequency at zero.

The 50 kHz FFT output value will have a value that follows the TM modulation. If the TM modulation has 4 bits per symbol, then a conversion from the numerical value of the FFT output, bracketed into 16 levels and converted to 4 binary bits produces the TM Modulation value.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of generating a signal, comprising the steps of:
receiving a carrier signal;
receiving an input signal, wherein said input signal conveys a modulation level;
generating quarter-cycle waveforms based on the input signal; and
assembling the generated quarter-cycle waveforms into a continuous output signal, wherein the output signal includes a first inflection between adjacent quarter-cycles forming a segment of the output signal between a first negative peak and a positive peak, and wherein the output signal includes a second inflection between adjacent quarter-cycles forming a segment of the output signal between the positive peak and a second negative peak, wherein said first and second inflections represent said modulation level.

2. The method of claim 1, wherein said modulation levels of said adjacent quarter-cycles are different.

3. The method of claim 1, wherein the quarter-cycle waveforms are generated as cosine segments of 180° length, at twice the carrier signal frequency, and wherein a first quarter-cycle waveform is generated at the equivalent carrier frequency quadrant of 0°-90°, a second quarter-cycle waveform is generated at the equivalent carrier frequency quadrant of 90°-180°, a third quarter-cycle waveform is generated at the equivalent carrier frequency quadrant of 180°-270°, and a fourth quarter-cycle waveform is generated at the equivalent carrier frequency quadrant of 270°-360°.

4. The method of claim 3, wherein the quarter-cycle waveforms are generated by a waveform generator or by software.

5. The method of claim 3, further comprising the step of:
frequency-shifting a third harmonic component of the output signal to the carrier signal frequency, and, wherein the third harmonic component preferably is frequency-shifted to the carrier signal frequency by generating a second harmonic and mixing the second and third harmonics.

6. A system for generating a signal, comprising:
a waveform generator configured to generate quarter-cycle waveforms based on a received carrier signal and a received input signal, wherein said input signal conveys a modulation level; and
an analog gate for assembling the generated quarter-cycle waveforms into a continuous output signal, wherein the output signal includes a first inflection between adjacent quarter-cycles forming a segment of the output signal between a first negative peak and a positive peak, and wherein the output signal includes a second inflection between adjacent quarter-cycles forming a segment of the output signal between the positive peak and a second negative peak, wherein said first and second inflections represent said modulation level.

7. The system of claim 6, wherein said modulation levels of said adjacent quarter cycles are different.

8. The system of claim 6, wherein the quarter-cycle waveforms are generated as cosine segments of 180° length, at twice the carrier signal frequency, and wherein a first quarter-cycle waveform is generated at the equivalent carrier frequency quadrant of 0°-90°, a second quarter-cycle waveform is generated at the equivalent carrier frequency quadrant of 90° 480°, a third quarter-cycle waveform is generated at the equivalent carrier frequency quadrant of 180°-270°, and a fourth quarter-cycle waveform is generated at the equivalent carrier frequency quadrant of 270°-360°.

9. The system of claim 6, further comprising:
(a) a frequency-shifter for frequency-shifting a third harmonic component of the output signal to the carrier signal frequency, and/or
(b) a phase-locked loop for generating a second harmonic component; and
a mixer, wherein the third harmonic component is frequency-shifted to the carrier signal frequency by mixing the second and third harmonics.

* * * * *

UNITED STATES PATENT AND TRADEMARK OFFICE
CERTIFICATE OF CORRECTION

PATENT NO. : 9,014,293 B2  
APPLICATION NO. : 13/841889  
DATED : April 21, 2015  
INVENTOR(S) : Richard C. Gerdes Page 1 of 1

It is certified that error appears in the above-identified patent and that said Letters Patent is hereby corrected as shown below:

In the Claims  
Claim 8, Col. 12, line 19, "90° 480°" should be --90°-180°--.

Signed and Sealed this  
Twenty-second Day of December, 2015

Michelle K. Lee  
*Director of the United States Patent and Trademark Office*

UNITED STATES PATENT AND TRADEMARK OFFICE
CERTIFICATE OF CORRECTION

| | | |
|---|---|---|
| PATENT NO. | : 9,014,293 B2 | Page 1 of 1 |
| APPLICATION NO. | : 13/841889 | |
| DATED | : April 21, 2015 | |
| INVENTOR(S) | : Richard C. Gerdes | |

It is certified that error appears in the above-identified patent and that said Letters Patent is hereby corrected as shown below:

On The Title Page, in (71) Applicant: delete "Medusa Scientific, LLC" and insert --TM IP Holdings, LLC--

Signed and Sealed this
Sixteenth Day of August, 2016

Michelle K. Lee
*Director of the United States Patent and Trademark Office*